United States Patent [19]

Inoue

[11] Patent Number: 4,458,130
[45] Date of Patent: Jul. 3, 1984

[54] IMMERSION-TYPE TRAVELING-WIRE ELECTROEROSION MACHINING METHOD

[75] Inventor: Kiyoshi Inoue, Tokyo, Japan

[73] Assignee: Inoue-Japax Research Incorporated, Yokohama, Japan

[21] Appl. No.: 295,502

[22] Filed: Aug. 24, 1981

[30] Foreign Application Priority Data

Sep. 4, 1980 [JP] Japan .................. 55-123195

[51] Int. Cl.³ ............................. B23P 1/08
[52] U.S. Cl. .................. 212/69 W; 219/69 D; 219/69 M
[58] Field of Search ............. 219/69 W, 69 M, 69 D, 219/69 E, 69 R; 204/129.6, 129.7

[56] References Cited

U.S. PATENT DOCUMENTS

| | | | |
|---|---|---|---|
| 3,168,638 | 2/1965 | Riddles | 219/69 D |
| 3,538,289 | 11/1970 | Burnet et al. | 219/69 W |
| 3,928,163 | 12/1975 | Ullmann et al. | 219/69 D |

FOREIGN PATENT DOCUMENTS

| | | | |
|---|---|---|---|
| 2721804 | 12/1977 | Fed. Rep. of Germany | 219/69 W |
| 2901712 | 8/1979 | Fed. Rep. of Germany | 219/69 D |
| 2904797 | 8/1979 | Fed. Rep. of Germany | 219/69 D |
| 65035 | 5/1980 | Japan | 219/69 D |
| 830917 | 3/1960 | United Kingdom | 204/129.6 |

Primary Examiner—M. H. Paschall
Attorney, Agent, or Firm—Karl F. Ross; Herbert Dubno

[57] ABSTRACT

A traveling-wire electroerosive cutting method using a worktank filled with a liquid machining medium in which a workpiece is immersed. A continuous wire electrode is transported from a supply unit to a takeup unit to axially travel and thereby traverse the workpiece in a cutting zone defined between a pair of cutting guide members spanned by the electrode. A nozzle is arranged in the cutting zone to inject a high-velocity stream of the coolant liquid machining medium into the machining gap which is formed in the workpiece juxtaposed with the traveling wire electrode and which is filled with and disposed in the relatively static liquid machining medium contained in the worktank. The liquid stream injected from the nozzle has a pressure in excess of 2 kg/cm² and preferably has a velocity in excess of 3 m/sec. A high-frequency (e.g. of a frequency of 1 kHz to 1 MHz) mechanical vibration is imparted to the traveling wire electrode in a direction transverse to the wire axis.

10 Claims, 2 Drawing Figures

IMMERSION-TYPE TRAVELING-WIRE ELECTROEROSION MACHINING METHOD

FIELD OF THE INVENTION

The present invention relates generally to electroerosive wire-cutting and, more particularly, to a new, improved and useful method of electroerosively cutting an electrically conductive workpiece with a continuous wire electrode across a machining gap in the presence of a machining liquid medium. The invention particularly relates to a method of the type described wherein the machining liquid medium is supplied to and is controlledly maintained in the machining gap in a novel manner such as to improve the performance of the electroerosive wire-cutting process generally.

BACKGROUND OF THE INVENTION

The process of electroerosive wire-cutting generally makes use of a continuous wire electrode composed of, say, brass or copper, and having a thickness ranging between 0.05 and 0.5 mm. The wire electrode is axially transported continuously along a given continuous guide path from a supply unit to a takeup unit through a workpiece disposed in a predetermined cutting zone. The cutting zone is commonly defined by a pair of cutting guide members which support the wire electrode across the workpiece. Wire traction and braking means allow the continuous wire to be tightly stretched between the supply and takeup units and to be axially driven between the cutting guide members while linearly traversing the workpiece, thus, presenting the continuously renewed electrode surface juxtaposed in a cutting relationship with the workpiece across a machining gap. The latter is flushed with a machining liquid medium supplied from one or more nozzles and is also electrically energized with an electric current which is passed between the wire electrode and the workpiece to electroerosively remove material from the latter. The cutting process may be performed in any of various electroerosive machining modes. In electrical discharge machining (EDM), the machining liquid medium is a dielectric liquid and the electric current is supplied in the form of a succession of electrical pulses. In electrochemical machining (ECM), the liquid medium is a liquid electrolyte and the machining current is a high-amperage continuous or pulsed current. In electrochemical-discharge machining (ECDM,) the machining medium has both electrolytic and dielectric character and the machining current preferably is applied in the form of pulses which facilitate the production of electrical discharges through the liquid medium.

As the electroerosive material removal proceeds, the workpiece is displaced relative to the wire electrode transversely to the axis thereof. This allows the wire electrode to advance transversely to the workpiece and consequently a cutting slot to be formed behind the advancing wire electrode. The continuous relative displacement along a preselected path results in the formation of a desired contour corresponding thereto and defined by this cutting slot in the workpiece.

In performing the electroerosive wire-cutting process, heretofore the cutting zone has been conveniently disposed in the air or like gaseous environment, and a nozzle is used to deliver the machining liquid medium to the cutting gap. The machining liquid is conveniently a water medium which may be ionized or deionized to various extents to serve as a desired electroerosive machining medium. It is desirable to keep the machining gap flushed with a sufficient volume of the cutting liquid and traversed thereby at a suitable rate to allow the electroerosive action to continue with stability, the cutting chips and other gap products to be carried away with smoothness, and the wire electrode to be cooled with effectiveness. In the conventional arrangement in which the cutting zone or nozzle is exposed to the air, however, the machining liquid, due to a pressure drop caused when it leaves the nozzle, tends to splash away so that most of it flows out without ever being forced through the narrow machining-gap spacing provided between the thin wire electrode and the workpiece. When the delivery of the liquid medium to the machining gap is insufficient or the machining gap is incompletely filled with the liquid medium, there develop gaseous discharges therein which impair the electroerosive process and removal of the gap products and eventually cause breakage of the wire electrode due to excessive heat which then develops or due to an insufficient cooling of the wire electrode. An uncontrolled increase of the pressure of the liquid trained towards the machining gap in the workpiece disposed in the air environment in an attempt to ensure full delivery of the machining liquid into the cutting zone will bring about an uncontrolled deflection or vibration of the wire electrode which again impairs the cutting stability. In short, there have been undue limitations of cutting stability and efficiency which accrue from the conventional gap flushing technique in the electroerosive wire-cutting process.

OBJECTS OF THE INVENTION

It is, accordingly, an important object of the present invention to provide a new and improved electroerosive wire-cutting method which assures an increased cutting stability and an enhanced removal rate or cutting efficiency.

A specific object of the invention is to provide an electroerosive wire-cutting method which allows a machining liquid medium to be delivered to and passed through the narrow machining gap without fail and in a sufficient volume and at a sufficient rate of flow, thereby enabling the cutting stability and efficiency to be improved over the prior art.

SUMMARY OF THE INVENTION

In accordance with the present invention, in a first aspect thereof, there is provided a method of electroerosively cutting an electrically conductive workpiece with a continuous wire electrode, in which method the wire electrode is axially transported to traverse the workpiece while defining a machining gap therewith flushed with a liquid machining medium and is electrically energized to electroerosively remove material from the workpiece while the latter is displaced relative to the wire electrode transversely to the axis thereof, thereby forming a machined contour in a preselected region of the workpiece, in which method said machining gap is flushed with said liquid machining medium by: (a) disposing the workpiece at least partly in a worktank and supplying the worktank with the liquid machining medium to immerse therein at least said selected region of the workpiece and (b) injecting from nozzle means into the said machining gap filled with the liquid machining medium in the worktank, a high-velocity stream (e.g. of a velocity in excess of 1 m/sec and preferably in excess of 3 m/sec) of the liquid machining medium having a pressure in excess of 2 kg/cm², and preferably in excess of 5 kg/cm² and still preferably between 10 and 100 kg/cm². It is advantageous to arrange the nozzle means in such a manner that it is at least partly immersed in the liquid machining medium in the worktank.

Preferably, a high-frequency mechanical vibration of a frequency of 1 kHz to 10 MHz and an amplitude of 1 to 50 micrometers is imparted to the wire electrode traveling through the machining gap in a direction transverse to the longitudinal axis of the wire electrode. As a result the traveling wire electrode will acquire an undulating oscillatory motion along the said axis with more than two nodes and antinodes or loops with a maximum amplitude preferably smaller than the size of the machining gap in the said direction.

Preferably, the wire electrode is axially transported to travel through the machining gap at a rate of travel in the range of 3 to 30 m/min. The liquid machining medium is preferably a water liquid having a specific resistance between $10^2$ and $10^5$ ohm-cm. The machining gap is electrically energized preferably by passing a succession of electrical pulses of a predetermined pulse duration $\tau$on and a predetermined current magnitude Ip, the ratio of Ip/$\tau$on being in excess of 50 where Ip is expressed in amperes and $\tau$on is expressed in microseconds.

The apparatus according to the invention for electroerosively cutting an electrically conductive workpiece with a continuous wire electrode comprises means for axially transporting the wire electrode, means for guiding the wire electrode across a cutting zone thereby to traverse the workpiece while defining a machining gap therewith in the presence of a liquid machining medium supplied by flushing means, a power supply for electrically energizing the machining gap to electroerosively remove material from the workpiece, means for advancing the workpiece relative to the wire electrode transversely to the axis thereof whereby a machined contour is formed in a preselected region of the workpiece, which apparatus comprises: a worktank for receiving the liquid machining medium to immerse at least the said preselected region of the workpiece and the machining gap therein; a workpiece support for securely holding the workpiece at a preselected position in the worktank; a worktable coupled with the worktank and arranged in conjunction with the advancing means for advancing the workpiece relative to the wire electrode; and nozzle means for injecting a high-velocity stream of the liquid machining medium into the machining gap filled with and onto the workpiece immersed in, the liquid machining medium in the workpiece. The nozzle means is preferably at least partly immersed in the liquid machining medium contained in the worktank.

The apparatus preferably includes vibration means for imparting one or more modes of mechanical vibrations to the wire electrode traveling through the machining gap in a direction transverse to the direction of the wire axis.

BRIEF DESCRIPTION OF THE DRAWING

These and other objects and features of the present invention as well as advantages thereof will become more readily apparent from the following description taken with reference to the accompanying drawing in which.

SPECIFIC DESCRIPTION

Figure 1:
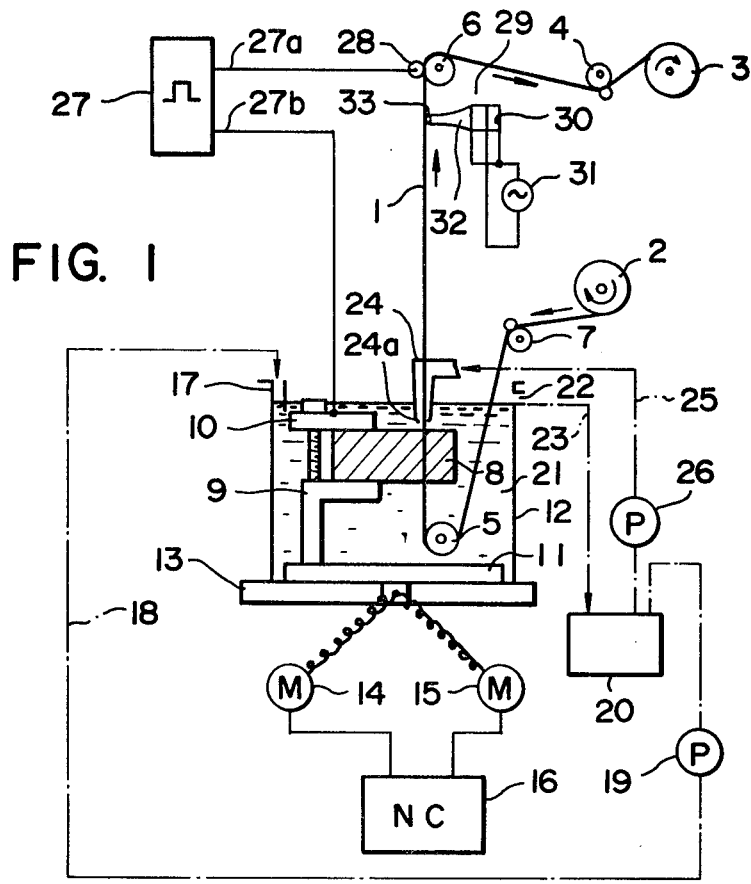
FIG. 1 is a schematic view partly in section and partly in a block-diagram form illustrating one embodiment of the present invention.

Referring now to FIG. 1, the electroerosive wire-cutting arrangement makes use of a continuous wire electrode 1 of a known metallic or alloy composition and having a thickness of 0.05 to 0.5 mm. The wire electrode 1 is axially driven from a supply reel 2 to a takeup reel 3 by a traction unit 4 to continuously travel through a cutting zone defined between a pair of cutting guide members 5 and 6. A suitable tension is given to the traveling wire electrode 1 by a braking unit 7. A workpiece 8 is disposed in the cutting zone between the guide members 5 and 6 and is traversed by the traveling wire electrode 1. The workpiece 8 is mounted on a support block 9 and securely held thereon by a clamping plate 10. The block 9 is securely mounted and stands on a base 11 fixed on the bottom of a worktank 12. The latter is in turn securely mounted on a table 13 which is displaceable in an X-Y plane by a pair of motors 14 and 15 operated by drive signals furnished from a numerical-control (NC) unit 16. The motor 14 is designed to displace the workpiece 8 along a predetermined X-axis and the motor 15 is designed to displace the workpiece 8 along a predetermined Y-axis orthogonal to the X-axis. The numerical controller 16 has input data preprogrammed therein which represents a desired path to be followed by the relative displacement between the workpiece 8 and the axis of a straight stretch of the wire electrode 1 traveling between the guide members 5 and 6. The guide member 5 shown in the form of a roller has a shaft which may be supported at a portion of a wall of the worktank 12, whereas the guide member 6 also shown in the form of a roller has a shaft which may be supported at a portion of a frame (not shown) of the machine.

The worktank 12 is formed with an inlet duct 17 which communicates via a conduit 18 with a pump 19 which draws a liquid machining medium from a reservoir 20 to supply the liquid machining medium into the worktank 12. The worktank 12 is thus filled with the liquid machining medium to a sufficient level such that the workpiece 8 is fully immersed therein. The liquid machining medium contained in the worktank 12 is shown at 21. The worktank 12 is also formed with an outlet duct 22 which returns the overflowing machining liquid 21 to the reservoir 20 via a conduit 23.

A nozzle 24 is also arranged and disposed in the cutting zone to direct a jet or high-velocity stream of the liquid machining medium into the machining gap formed between the wire electrode 1 and the workpiece 8 and immersed in the liquid machining medium 21, in accordance with the present invention. The nozzle 24 has its nozzle opening 24a immersed in the liquid machining medium 21 contained in the worktank 12 and communicates via a conduit 25 with a high-pressure pump 26 which draws the liquid machining medium from the reservoir 20.

The reservoir 20 typically includes a filter which purifies the waste liquid led from the worktank 12 via the conduit 23. The liquid machining medium for reception by the worktank 12 and for high-velocity delivery by the nozzle 24 is preferably a deionized water liquid having a specific resistance between $10^2$ and $10^5$ ohm-cm. The reservoir unit 20 should then include a water deionization unit, e.g. ion-exchange device, for treating the filtered waste machining liquid so that the treated liquid for supply into the worktank 12 via the conduit 18 and for pumping through the nozzle 24 into the machining gap has its resistivity maintained at a desired value or in a desired range. Advantageously a temperature controller is also provided in the reservoir 20 to maintain the temperature of the treated machining liquid at a desired value (e.g. 20° C.) or in a desired temperature range (e.g. 15° to 25° C.).

An electroerosion power supply 27 has a pair of output terminals 27a and 27b which are electrically connected to the wire electrode 1 and the workpiece 8 via a conducting brush 28 and the clamping element 10, respectively, to electrically energize the machining gap and thereby supply an electrical machining current between the wire electrode 1 and the workpiece 8 so that material is electroerosively removed from the workpiece 8. The electrical machining current is preferably in the form of a succession of electrical pulses having a preselected current magnitude (peak current) Ip, pulse duration (on time) $\tau$on and pulse interval (off time) $\tau$off.

As material removal proceeds, the data stored in the NC unit 20 is reproduced and converted into drive signals which are applied to the motors 14 and 15, thereby displacing the workpiece 8 relative to the wire electrode 1 in the preset X-Y plane along the preprogrammed path. Thus, the wire electrode 1 stretched in a direction transverse to the X-Y plane is advanced relatively along this path, forming an electroerosion-cutting slot behind it. The continued relative displacement along this path results in the formation in the workpiece 8 of a wire-cut contour defined by the cutting slot and corresponding to the preprogrammed path.

Preferably, a vibration unit 29 is also provided in the cutting zone defined between the cutting guide members 5 and 6. The vibrator unit 29 may be disposed, as shown, above the surface level of the liquid machining medium 21 contained in the worktank 12 or may, alternatively, be immersed in the liquid machining medium 21. The vibrator unit 29 may comprise an electromechanical transducer 30 energized by a power supply 31 and a horn structure 32 attached to the electromechanical transducer 30 and having a tip 33 to be positioned in contact with or proximate to the traveling wire electrode 1. When the transducer 30 is energized by the power supply 31, a mechanical vibration is generated therein and transmitted, with amplification by the horn 32, to the traveling wire electrode 1. As a result, the traveling wire electrode 1 acquires an undulating motion along the wire axis with more than two nodes and antinodes or loops. The mechanical vibration is adjusted, by adjusting on the power supply and on selection of the transducer 30, to have a frequency in the range between 1 kHz and 10 MHz and an amplitude in the range between 1 and 50 micrometers. The undulating oscillatory motion acquired by the traveling wire electrode thus has a small maximum amplitude in a direction transverse to the wire axis. It is desirable that this amplitude be no greater than the size of the machining gap.

It has been found that by immersing the workpiece 8 and the machining gap in the liquid machining medium 21 contained in the worktank 12 and directing a jet or high-velocity stream of the liquid machining medium from the nozzle 24 into the machining gap filled with and immersed in the liquid machining medium in the worktank 12, a marked improvement in electroerosive wire-cutting performance is achieved over that of the prior art in which the liquid machining medium is simply poured over the workpiece so as to flow into and through the machining gap therein disposed simply open to the air atmosphere. The pressure or the jet of high-velocity stream of the liquid machining medium to be injected into the machining gap filled with and immersed in the liquid machining medium substantially statically received in the worktank according to the invention should be in excess of 2 kg/cm$^2$, and preferably in excess of 5 kg/cm$^2$, and still more preferably between 10 and 100 kg/cm$^2$. Its velocity should be in excess of 1 m/sec, and preferably in excess of 3 m/sec. Thus, the novel arrangement according to the present invention yields a marked increase in the removal rate and an extremely stabilized mode of wire-cutting with less tendency towards wire breakage. It has also been found that the advantages of the present invention are further promoted by imparting a mechanical vibration of the type already described to the wire electrode in a direction transverse to the wire axis.

EXAMPLE

Figure 2:
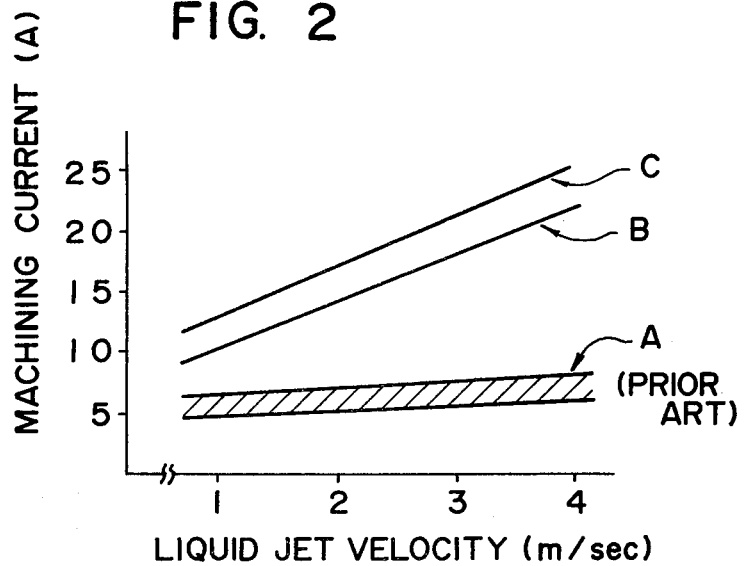
FIG. 2 is a graphical representation of relationship between the velocity of a machining liquid medium supplied from a nozzle into the machining gap and the machining current for a prior-art (A) and for two arrangements (B and C) according to the present invention.

A workpiece composed of S55C steel and having a thickness of 30 mm is electroerosively machined with a copper wire electrode of 0.2 mm diameter using a succession of electrical pulses of a frequency of 500 kHz and a deionized water machining liquid having a specific resistance of $10^4$ ohm-cm, both according to the prior art and according to the present invention. Machining results are shown in the graph of FIG. 2 in which the velocity v of a jet or stream supplied via the nozzle 24 of FIG. 1 is plotted along the abscissa and the average machining current Im which can then be achieved is plotted along the ordinate. The band A in the graph of FIG. 1 represents a v-Im relationship according to the prior art where the worktank 12 of FIG. 1 stores practically no liquid machining medium and the liquid machining medium flushing the machining gap is supplied solely from the nozzle 24. The curves B and C represent v-Im relationships obtained according to the invention where the worktank 12 is filled with the liquid machining medium in which the workpiece 8 is immersed and the jet of the liquid machining medium is injected from the nozzle 12 into the liquid immersed machining gap. The curve B is obtained where no vibration is imparted to the wire electrode 1 and the curve C is obtained when a mechanical vibration of a frequency of 1 MHz and an amplitude of 5 'micrometers is imparted to the traveling wire electrode throughout the course of the machining operation.

From the graph it is apparent that there is no appreciable change in the average machining current with increase in the velocity of the flushing machining liquid jet in the case of the prior art and in contrast thereto there occurs a proportional increase in the average machining current with increase in the velocity of the flushing machining liquid jet according to the present invention. For example, with a jet velocity of 4 m/sec, an average machining current as high as 25 amperes is obtained and this represents a current more than five times greater than that attainable with the prior art. An increased average machining current, of course, means an increased removal rate. Thus, it should be noted that a removal rate of 2.6 mm/min is obtained with an average machining current of 7.8 amperes and a removal rate of 3.2 mm/min is obtained with an average machining current of 10.8 amperes. It is apparent that according to the invention a marked increase in removal rate results, and this should be compared with a limited removal rate of 0.5 mm/min in the prior art.

It should also be noted that according to the present invention a greater ratio of the current magnitude Ip to the pulse duration $\tau on$ can advantageously be employed, Ip/$\tau on$ being as high as 50 or even more than 100 where Ip is expressed in amperes and $\tau on$ is expressed in microseconds. Further, a greater rate of travel of the wire electrode can advantageously be used, e.g. 3 m/min. to 10 m/min.

It should be apparent that various modifications are possible in the arrangement of the invention shown in FIG. 1. For example, the nozzle 24 may be disposed to direct the jet or high-velocity stream of the liquid machining medium from below towards the lower side of the workpiece into the machining gap. A pair of two nozzles may be provided one as shown and the other as just described. Alternatively, one or more nozzles may be arranged to direct the liquid jet(s) or stream(s) laterally into the machining gap. In this case, it is advantageous to cover the upper and lower surfaces of the workpiece with rubber or the like elastomeric plates.

Generally, it is advantageous that the wire electrode 1 travels traversing the workpiece 8 in a direction (i.e. up to down or down to up) which is the same direction in which the liquid jet or stream is directed from the nozzle 24 (i.e. from up or down).

What is claimed is:

1. In a method of electroerosively wire-cutting an electrically conductive workpiece wherein a continuous electrode wire traversing the workpiece and stretched under tension thereacross is axially transported at a preselected rate of axial travel to continuously renew an electrode surface juxtaposed and defining a traveling-wire cutting gap therewith in the presence of a machining medium and the cutting gap is electrically energized to electroerosively remove material from the workpiece against the renewing electrode surface while the workpiece is displaced relative to the traveling electrode wire transversely along a desired path of cutting, the improvement which comprises the steps of:
   (a) immersing said workpiece in a continuous, substantially static mass of a liquid medium retained in a worktank so that the region of said traveling-wire cutting gap is located substantially below the surface of said mass and is thereby directly enclosed with said liquid medium and thereby subjected to a hydrostatic pressure exerted by said mass;
   (b) disposing at least one nozzle means adjacent to said workpiece so as to have a nozzle opening directly immersed in said mass and trained towards and spaced from said region directly across said liquid medium; and
   (c) supplying said nozzle means with a liquid machining medium so as to project a high-velocity stream thereof from said nozzle opening through the first-mentioned liquid medium into said region directly immersed in said substantially static mass.

2. The method defined in claim 1, wherein said high-velocity stream has a velocity in excess of 1 m/sec.

3. The method defined in claim 1 or claim 2 wherein said high-velocity stream is projected from said nozzle opening at a pressure in excess of 2 kg/cm$^2$.

4. The method defined in claim 3 wherein said pressure ranges between 10 and 100 kg/cm$^2$.

5. The method defined in claim 2 wherein said velocity is in excess of 3 m/sec.

6. The method defined in claim 1 or claim 2, further comprising the step of imparting a mechanical vibration to said electrode wire traveling through the workpiece in said substantially static mass, in a direction transverse to the axis of the electrode wire.

7. The method defined in claim 6 wherein said mechanical vibration has a frequency ranging between 1 kHz and 10 MHz.

8. The method defined in claim 1 or claim 2 wherein said rate of axial travel of the electrode wire ranges between 3 and 10 m/min.

9. The method defined in claim 1 or claim 2 wherein said liquid machining medium is deionized water liquid.

10. The method defined in claim 1 or claim 2 wherein said cutting gap is electrically energized by passing a succession of electrical pulses of a predetermined pulse duration $\tau on$ and current magnitude Ip between said electrode wire and said workpiece, the ratio Ip/$\tau on$ being in excess of 50 where Ip is expressed in amperes and $\tau on$ is expressed in microseconds.

* * * * *